(12) United States Patent
Ng et al.

(10) Patent No.: US 11,073,608 B2
(45) Date of Patent: Jul. 27, 2021

(54) RESOLVING RADAR ANGLE AMBIGUITIES USING A MULTIPLE HYPOTHESIS TRACKER

(71) Applicant: RAYTHEON COMPANY, Waltham, MA (US)

(72) Inventors: Justin Ng, Waltham, MA (US); Ephrem S. Paredes, Waltham, MA (US); Katherine K. Cheung, Waltham, MA (US); Samuel Blackman, Waltham, MA (US); Robert Dempster, Waltham, MA (US)

(73) Assignee: Raytheon Company, Waltham, MA (US)

( * ) Notice: Subject to any disclaimer, the term of this patent is extended or adjusted under 35 U.S.C. 154(b) by 331 days.

(21) Appl. No.: 16/245,112

(22) Filed: Jan. 10, 2019

(65) Prior Publication Data

US 2020/0116853 A1 Apr. 16, 2020

Related U.S. Application Data

(60) Provisional application No. 62/744,532, filed on Oct. 11, 2018.

(51) Int. Cl.
*G01S 13/72* (2006.01)
*G01S 7/282* (2006.01)
(Continued)

(52) U.S. Cl.
CPC ............ *G01S 13/726* (2013.01); *G01S 7/282* (2013.01); *G01S 7/285* (2013.01); *G01S 13/66* (2013.01); *G01S 13/72* (2013.01)

(58) Field of Classification Search
CPC ........ G01S 13/726; G01S 13/72; G01S 13/66; G01S 7/282; G01S 7/285
See application file for complete search history.

(56) References Cited

U.S. PATENT DOCUMENTS 4,649,390 A 3/1987 Andrews et al.
5,414,643 A 5/1995 Blackman et al.
(Continued)

FOREIGN PATENT DOCUMENTS

CN 102831620 A * 12/2012
CN 105 093 201 B 5/2018
(Continued)

OTHER PUBLICATIONS

Yamada et al., "Multi-dimensional Multiple Hypothesis Tracking with a Gaussian Mixture Model to Suppress Grating Lobes", 20th International Conference on Information Fusion, Xi'an, China, Jul. 10-13, 2017. (Year: 2017).*
(Continued)

*Primary Examiner* — Erin F Heard
*Assistant Examiner* — Thomas M Hammond, III
(74) *Attorney, Agent, or Firm* — Lewis Roca Rothgerber Christie LLP

(57) ABSTRACT

Radar system that utilizes Multiple Hypothesis Tracker (MHT) to resolve angle ambiguities, from a series of dwells with ambiguous detections over time. The system receives first and second observation, forms radar tracks and ambiguous angle detections using unfolding data at each of the ambiguous angle detections, scores the radar tracks to determine a best hypothesis of tracks, where a hypothesis for the MHT is formed by collecting compatible tracks into the hypothesis and computing probabilities of the hypothesis by using the score of each radar track in said hypothesis, and compares the scores of all the radar tracks originating from the first observation data to determine whether one of the scores of the radar tracks exceeds the scores of all other radar tracks originating from the same first observation data by a predetermined range.

20 Claims, 5 Drawing Sheets

(51) Int. Cl.
*G01S 7/285* (2006.01)
*G01S 13/66* (2006.01)

(56) References Cited

U.S. PATENT DOCUMENTS

| | | | | |
|---|---|---|---|---|
| 5,765,166 | A * | 6/1998 | Gotfried | G01S 13/726 707/737 |
| 8,654,005 | B2 | 2/2014 | Christopher et al. | |
| 2013/0093617 | A1 * | 4/2013 | Christopher | G01S 13/72 342/146 |
| 2014/0072233 | A1 * | 3/2014 | Horwood | G01S 13/726 382/201 |
| 2014/0191899 | A1 * | 7/2014 | Pickle | G01S 13/888 342/175 |
| 2016/0161606 | A1 * | 6/2016 | Turner | G01S 13/726 702/150 |
| 2019/0056506 | A1 * | 2/2019 | Bialer | G01S 7/4004 |

FOREIGN PATENT DOCUMENTS

| | | |
|---|---|---|
| EP | 2 581 758 A1 | 4/2013 |
| JP | 2017 067624 A | 4/2017 |

OTHER PUBLICATIONS

Long et al., "Target Tracking Using SePDAF under Ambiguous Angles for Distributed Array Radar", Sensors, Sep. 9, 2016. (Year: 2016).*
Blackman, "Multiple Hypothesis Tracking for Multiple Target Tracking", IEEE Aerospace and Electronic Systems Magazine, vol. 19, No. 1, Jan. 1, 2004 (pp. 5-18).
Cabrera, "Scheduling Variable Field-of-View Sensors for Tracking Multiple Objects", 2018 52nd Asilomar Conference on Signals, Systems, and Computers, IEEE, Oct. 28, 2018 (pp. 2174-2178).
Shaw, et al., "Design and Implementation of a Fully Automated OTH Radar Tracking System", IEEE May 8, 1995 (pp. 294-298).
Yamada, et al., "Hybrid Multiple Hypotheses Tracking to Suppress Grating Lobe Observations in Separated Antenna Arrays", Proceedings of the 2016 IEICE General Conference Mar. 18, 2016 (pp. 285).
International Search Report for corresponding International Application No. PCT/US2019/042164, filed Jul. 17, 2019, International Search Report dated Sep. 27, 2019 and dated Oct. 8, 2019 (6 pgs.).
Written Opinion of the International Searching Authority for corresponding International Application No. PCT/US2019/042164, filed Jul. 17, 2019, Written Opinion of the International Searching Authority dated Oct. 8, 2019 (10 pgs.).
Long et al., "Target Tracking Using SePDAF under Ambiguous Angles for Distributed Array Radar," Sensors, 2016, 16, 1456; doi:10.3390/s16091456, MDPI Journal, pp. 1-14.
Doan et al., "Optimized Algorithm for Solving Phase Interferometer Ambiguity," IEEE, 2016, 978-1-5090-2518, pp. 1-6.

* cited by examiner

RESOLVING RADAR ANGLE AMBIGUITIES USING A MULTIPLE HYPOTHESIS TRACKER

CROSS-REFERENCE TO RELATED APPLICATIONS

This Patent Application claims the benefits of U.S. Provisional Patent Application Ser. No. 62/744,532, filed on Oct. 11, 2018 and entitled "Resolving Radar Angle Ambiguities Using a Multiple Hypothesis Tracker," the entire content of which is hereby expressly incorporated by reference.

GOVERNMENT LICENSE RIGHTS

This invention was made with Government support. The Government has certain rights in the invention.

FIELD OF THE INVENTION

The disclosed invention generally relates to radars and target tracking, and more specifically to resolving radar angle ambiguities using a multiple hypothesis tracker.

BACKGROUND

A typical radar system includes a transmitter, a receiver, and an antenna. After producing a brief radio frequency (RF) pulse, the transmitter is turned off for the receiver to sample echoes. In a radar system, a radio signal of a particular carrier frequency is turned on and off at a pulse repetition frequency rate (PRF). The reciprocal of the PRF is the pulse repetition interval (PRI). The required PRI of the radio signal is typically a function of the radar's desired range, because the radio signal has to travel out to the target and reflect back from the target to the receiver again. A coherent processing interval (CPI) in radar systems indicates a group of multiple pulses, usually with the same PRF and center frequency. A CPI generally includes multiple coherently integrated pulses. Longer periods are required for longer range signals, requiring lower PRFs. Conversely, higher PRFs produce shorter unambiguous ranges, but could broadcast more pulses in a given amount of time. These are just a few design trades one must take into account when designing a radar system.

Detections generated by a radar system can be ambiguous in various dimensions. The following major classifications of waveforms define potential ambiguity resolution in range and Doppler: Low-PRF waveforms are generally unambiguous in range but ambiguous in Doppler, medium-PRF waveforms are ambiguous in both range and Doppler, and high-PRF waveforms are ambiguous in range but unambiguous in Doppler. Also range and range rate may be denied through use of various ECM techniques. Angle (azimuth and elevation) ambiguities can be caused by the use of spoiled beam patterns and use of individual antenna elements as interferometers for increasing coverage area of an individual radar dwell.

A radar dwell is the area covered by a radar beam at a given time. Signal processing of that dwell data results in detections which could possibly be targets. However, the detections can result from real targets or false alarms (e.g., clutter, system noise). A radar track is a set of associated observations that represents the current state estimate of a single target's location. A radar track typically contains the following target track information: state estimate (in two or three dimensions), dwell time and a unique track number. The state estimate includes quantities such as the location and velocity or possibly acceleration of the target track.

The role of a radar tracker is to process dwell updates from the radar system (which typically occurs at a time interval on the order of tens of milliseconds, and revisits a particular region once every 1 to 15 seconds) and to determine those temporal sequences of detections belonging to the same target, while rejecting any detections believed to be false alarms. In addition, the radar tracker is able to use the sequence of detections over time to not only obtain a smoothed estimate of the current position, but also a current smoothed velocity state of the target. When several targets are present, the radar tracker strives to provide one track for each target, with the track history often being used to indicate where the target has come from.

Ideally, ambiguities in a radar detection system are undesirable, since they can lead to false targets and/or more processing time. However one may make a design choice to introduce ambiguities because it may help meet other system requirements. For example, spoiled (larger) beams help increase the volume that can be covered in a single radar dwell. Not using spoiled beams can lead to dwells that take 2 to 3 times longer than if the beam was spoiled. This results in meeting dwell coverage requirements but also leads to detections with angle ambiguities.

Traditionally, individual radar dwells use 2+ PRFs to eliminate range and range rate/Doppler ambiguities. To help meet system requirements for high update/revisit rates, the use of a single PRF can reduce the amount of time it takes to complete a radar dwell. Alternatively, to help meet system requirements for detection of low observable targets, the use of a single PRF with a longer coherent processing interval (CPI) can increase detection probability of a target without modifying the amount of time it takes to complete a radar dwell. The downside of using a single PRF dwell is that the resulting detections are ambiguous in both range and range rate/Doppler.

SUMMARY

In some embodiments, the disclosed invention utilizes Multiple Hypothesis Tracker (MHT) to resolve angle ambiguities, while allowing the system design to be flexible enough to meet system radar coverage requirements. This eliminates the need for additional radar dwells at different PRFs and thus conserves radar resources.

In some embodiments, the disclosed invention a method, executed by a radar system, for resolving radar angle ambiguity using multiple hypothesis tracking (MHT). The method includes: a) receiving first observation data as a result of a first radar scan for a given radar range and Doppler, the first observation data comprising first measured angles of a true target and false angle ambiguities; b) forming ambiguous angle detections using unfolding data from the first radar scan and Initializing radar tracks at each of the ambiguous angle detections; c) storing all radar tracks formed from the ambiguous angle detections into an ambiguous angle set; d) receiving a next observation data as a result of a next radar scan for the same given radar range and Doppler, the next observation data comprising measured angles of the true target and the false angle ambiguities; e) scoring the radar tracks to determine a best hypothesis of tracks, wherein a hypothesis for the MHT is formed by collecting compatible tracks into the hypothesis and computing probabilities of the hypothesis by using the score of each radar track in said hypothesis; f) comparing the scores of all the radar tracks originating from the first observation data to determine whether one of the scores of the radar tracks exceeds the scores of all other radar tracks originating from the same first observation data by a predetermined range; g) when a score of a particular radar track exceeds the scores of all the other radar tracks originating from the same first observation data by a predetermined confirmation threshold, confirming the particular radar track as corresponding to the true target; h) transmitting the confirmed radar track for further data processing; and i) when there is not any radar track whose score exceeds the scores of all the other radar tracks originating from the same first observation data by the predetermined range, repeating steps b to i until the score of one radar track exceeds the scores of all the other radar tracks originating from the same first observation data by the predetermined confirmation threshold, or until a predetermined number of iterations is reached.

In some embodiments, the disclosed invention a radar system for resolving radar angle ambiguity using multiple hypothesis tracking (MHT) that includes a transmitter for transmitting power selected waveforms for a plurality of radar scans; a receiver for receiving returning signals from true targets and extraneous returning signals from false targets; and one or more processors. The one or more processors a) receives first observation data as a result of a first radar scan for a given radar range and Doppler, the first observation data comprising first measured angles of a true target and false angle ambiguities; b) forms ambiguous angle detections using unfolding data from the first radar scan and initializing radar tracks at each of the ambiguous angle detections; c) stores all radar tracks formed from the ambiguous angle detections into an ambiguous angle set; d) receives a next observation data as a result of a next radar scan for the same given radar range and Doppler, the next observation data comprising measured angles of the true target and the false angle ambiguities; e) scores the radar tracks to determine a best hypothesis of tracks, wherein a hypothesis for the MHT is formed by collecting compatible tracks into the hypothesis and computing probabilities of the hypothesis by using the score of each radar track in said hypothesis; f) compares the scores of all the radar tracks originating from the first observation data to determine whether one of the scores of the radar tracks exceeds the scores of all other radar tracks originating from the same first observation data by a predetermined range; g) when a score of a particular radar track exceeds the scores of all the other radar tracks originating from the same first observation data by a predetermined confirmation threshold, confirms the particular radar track as corresponding to the true target; h) transmits the confirmed radar track for further data processing; and i) when there is not any radar track whose score exceeds the scores of all the other radar tracks originating from the same first observation data by the predetermined range, repeats steps b to i until the score of one radar track exceeds the scores of all the other radar tracks originating from the same first observation data by the predetermined confirmation threshold, or until a predetermined number of iterations is reached.

In some embodiments, the data processing may include radar applications, self-driving car applications, and/or navigation applications In some embodiments, the confirmation threshold is adjusted depending on one or more of an environment's target density, sensor's false alarm rate, and user requirement. In some embodiments, the separate incompatible observation sets contain detections at the same ambiguous range and Doppler but different ambiguous angles.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
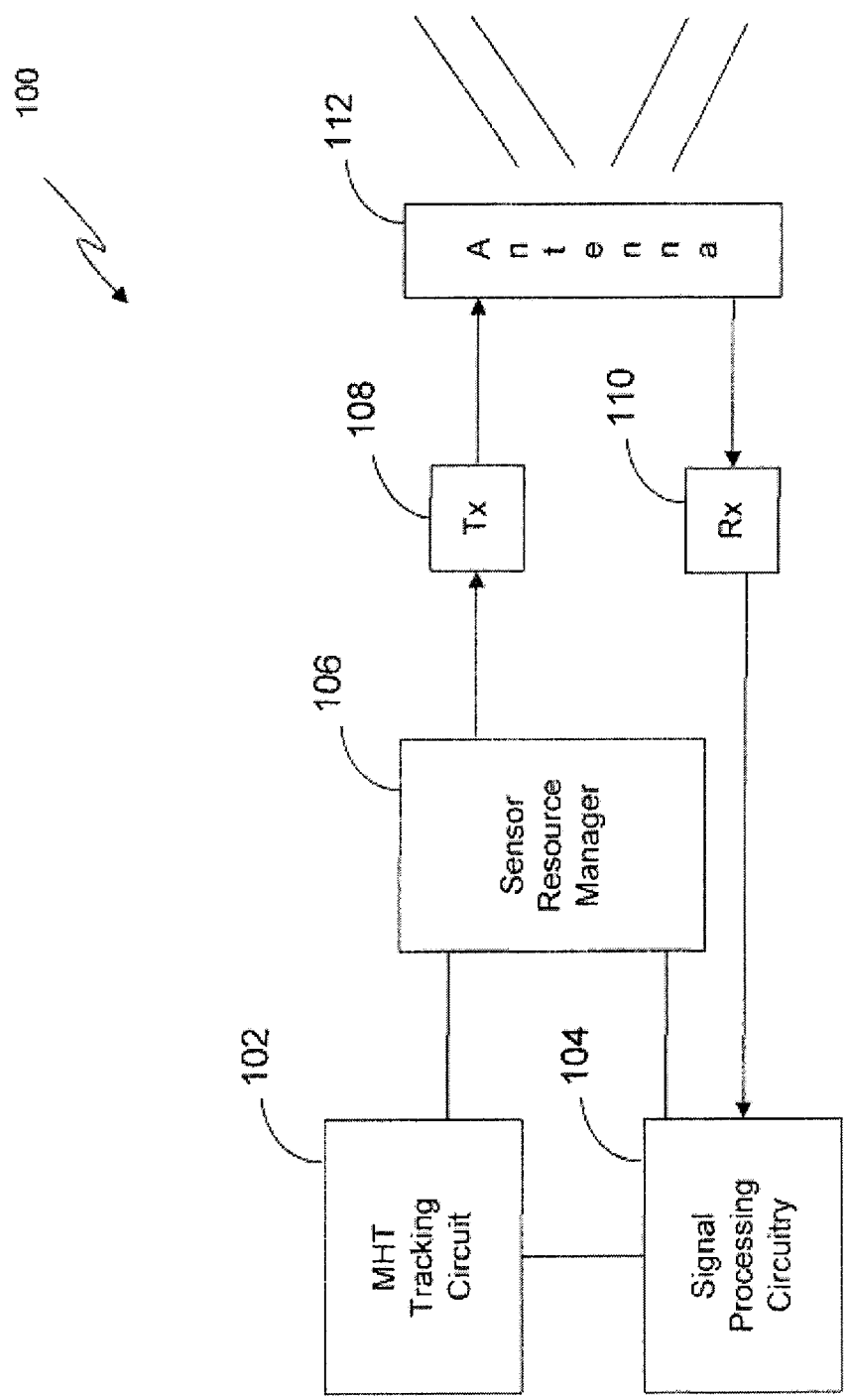
FIG. 1 is an exemplary block diagram of a radar system for resolving radar or sensor ambiguities using multiple hypothesis tracking, according to some embodiments of the disclosed invention.

In some embodiments, the disclosed invention utilizes Multiple Hypothesis Tracker (MHT) to resolve angle ambiguities, while allowing the system design to be flexible enough to meet system radar coverage requirements. This eliminates the need for additional radar dwells at different PRFs and thus conserves radar resources. In some embodiments, the disclosed invention is a radar system configured to resolve radar or any observation sensor angle ambiguities using a multiple hypothesis tracker (MHT). In radar applications where high search revisit rates are required (high priority targets) for a large search volume, spoiled beam patterns can be used, however, these introduce angle ambiguities.

Instead of requiring dedicated dwells to resolve each angle ambiguity, an MHT process can resolve the ambiguity from a series of dwells with ambiguous detections over time. This can save significant radar timeline in cases where instantaneous ambiguity resolution is not required. However, techniques for resolving range and Doppler ambiguities such as using kinematic scoring and requiring multiple PRF dwells are not sufficient for resolving angle ambiguities. Instead, the disclosed invention maintains and uses an ambiguous angle set (AAS) in an MHT to determine successful resolution of angle ambiguities.

Some examples of applications and improved technologies using the disclosed invention include military radar applications that need to be aware of incoming or outgoing targets, self-driving cars that need to be aware of other cars and surroundings, aircraft flying through high traffic environment and any other navigation technology or application that tracks an object using a radar sensor.

Ambiguous angles at the same range and Doppler are kinematically similar and they are all seen at the same PRFs. The disclosed invention produces an ambiguous angle set, that is, a subset of the incompatible set containing detections at the same ambiguous range and Doppler but different ambiguous angles. As the target moves in angle relative to the radar system, the incorrect ambiguous angles changes. As a result, the track on the true target will be updated more frequently than tracks on the ambiguous angles. Prior to confirmation, a comparison of tracks with detections from the same ambiguous angle set is used to determine if the angle ambiguity is successfully resolved. All tracks that are initiated or updated with observations from an ambiguity set are defined to be incompatible. Tracks are defined to be incompatible if they contain one or more common observations. Thus, under the assumption that a target produces at most a single observation per dwell, at most (none in the case of a series of false alarm detections) one of the incompatible tracks can represent a true target.

According to some embodiments of the disclosed invention, detection of a single dwell are processed by an MHT process. Each detection in the current dwell is given an opportunity to gate in all detection dimensions with each track in the system. Final track pruning based upon probability is deferred until all of the tracks have been processed for a given dwell. Thus, a track can be updated by more than one observation on a single dwell, but an observation can only be used once in any valid hypothesis. In general, observations may represent a myriad of different targets, for example, unmanned aerial vehicles (UAVs), fixed wing aircraft, rotor aircraft, aerostats, etc.

In some embodiments, the disclosed invention resolves radar and sensor angle ambiguities in a MHT by grouping angle ambiguous detections into an incompatible set, and use each of the angle ambiguous detections to initiate and update tracks. Tracks that are initiated or updated with detections from the same incompatible set are defined to be incompatible with each other. After processing all of the ambiguous angle detections in a dwell, the tracks are scored and the best hypothesis of tracks is determined. After data association in which the ambiguous detections are used to update a set of tracks (including the score update) which are deemed to be incompatible with each other, the updated tracks are used in hypothesis formation to determine the best hypothesis based on the summed score of the tracks in that hypothesis, while using the incompatibility restriction to not allow incompatible tracks in the same hypothesis. Tracks that satisfy a confirmation criteria (e.g., a confirmation probability threshold) are then output. In some embodiments, the disclosed invention defines a quadrant using 4 adjacent antenna elements as an interferometer resulting in 4 ambiguous angle detections which are input to the MHT.

For range and Doppler ambiguities, tracks that are produced using the incorrect ambiguity are typically not kinematically consistent with a real target. As a result, scores for tracks with the incorrect range and/or Doppler would be lower than the score for the track on the true target. Furthermore, implementing a confirmation criteria of requiring tracks to have detections at multiple PRFs results in essentially perfect resolution of range and Doppler ambiguities.

FIG. 1 is an exemplary block diagram of a radar system 100 for resolving radar ambiguities using MHT, according to some embodiments of the disclosed invention. As shown, the radar system 100 includes MHT tracking circuitry 102 coupled to a signal processor 104 and a sensor resource manager 106. The sensor resource manager 106 is coupled to transmit circuitry 108 and the signal processing circuitry 104 is coupled to the receive circuitry 110. The transmit circuitry 108 and the receive circuitry 110 are each coupled to a radar antenna 112. One skilled in the art would recognize that MHT tracking circuitry 102, signal processor 104 and sensor resource manager 106 may be implemented as separate circuitries, or be fully or partially combined in a processor with memory, I/O circuitry, firmware and software, such as the signal processor 104 or a different processor.

In operation, the sensor manager 106 can choose a different waveform and/or beam direction for each scan. This choice may be determined by some a priori defined schedule or may be chosen adaptively from the track data or may very well be a system radar coverage requirement. In general, there will be different beam directions chosen using spoiled beams for consecutive scans so that the false ambiguous angle returns will differ from scan to scan while the true target angle returns will be consistent from scan to scan. For example, in some embodiments, 3 to 7 differing PRF values may be chosen to improve angle ambiguity resolution and to ensure that the target will be in a clear region to avoid being eclipsed. Eclipsing occurs when the target return would be received at the time that the radar is transmitting and thus has its receiver turned off. Having an estimate of target position will lead to a better choice of PRF to avoid eclipsing.

Radar transmitter 108 transmits power (e.g., selected waveforms provided by sensor manager 106) and receiver 110 receives returning signal from true targets as well as extraneous returns such as clutter (e.g., false targets). This returning signal will be sent to signal processor 104. Signal processor 104 then analyzes the data in the returning signal to determine the location of potential targets. Typically, based upon the returns from a single waveform, it will not be possible to determine the exact location of a potential target (Spatial Processing). Rather, there will be an ambiguous set of possible target locations, range rates and target angles that all represent feasible target positions and radial velocities. Although the correct measurement in the set cannot be determined, the set of potential measurements that represents at most a single target can be identified. This set is tagged and sent to MHT tracker 102 to be resolved using data from later scans, as describe below.

MHT tracking circuitry 102 performs gating and scoring. For example, new measurements are compared with the predictions of previously (on past scans) formed tracks. Gating is used to determine feasible (achievable) observation-to-track associations, and the goodness of fit between the measurements and the track predictions is used to score the branch tracks that are formed by updating a prior track with a new measurement. Goodness of fit can be defined by a track score that measures the kinematic consistency of the observations in a track with previously defined models for target dynamics and measurement quality. In this step, the predicted positions of the tracks formed from incorrect ambiguous measurements does not typically correspond with the incorrect (non-target, e.g., clutter) measurements obtained from the use of a different waveform. However, the tracks formed on correct prior angle measurements are typically associated with new measurements that represent true target angular positions. This will be reflected in the track scores that will later be converted to probabilities when performing hypothesis formation. New tracks are also initiated upon all measurements under the hypothesis that a previously untracked target has been newly detected.

MHT tracking circuitry 102 also performs hypothesis formation and track probability calculation. For example, all tracks that were initiated or updated by measurements that are in the same ambiguity set can be defined to be incompatible. Then, hypotheses can be formed by collecting compatible tracks into hypotheses and computing the probabilities of those hypotheses by using the score of each track in that hypothesis. Track probabilities are then computed by summing up the probabilities of all of the hypotheses which have that track in it. If the track probability falls below a deletion threshold, the track is deleted. Subject to further tests that are required to maintain computational feasibility, the remaining tracks are propagated to the next dwell. Since incompatible tracks cannot be contained in the same hypothesis, the members of ambiguous angle sets are, in effect, competing for probability.

Hypotheses are collections of tracks and the hypothesis probabilities are computed as described below and known in the art. A track probability is the sum of the probabilities of the hypotheses that contain it. The members of an ambiguous angle set will all be in different hypotheses and the sum of their probabilities can be no greater than unity. Thus, track probabilities are determined by the quality (score) of the hypotheses that contain them so that the tracks are, in effect, competing to be in the best (highest probability) hypotheses.

Then, eventually at most one member of a past ambiguity set will be left in any track that is continued. Once the range and Doppler ambiguity is resolved and a track passes a first confirmation probability threshold, it must furthermore pass a second confirmation score threshold above scores of other members of the ambiguous angle set to resolve angle ambiguity so that the track can be presented to the user. In some embodiments, track confirmation may be performed by an application of the classical Sequential Probability Ratio Test (SPRT) where, the threshold value is chosen in order to satisfy a system defined false track acceptance requirement. Specifically for this application of the SPRT, the confirmation probability threshold is computed from the input rate of observations and a user specified false track confirmation rate.

MHT tracking circuitry 102 also performs track prediction. For example, all remaining tracks can be predicted to the time of the next set of angle measurement data. This generally includes both tracks that are resolved and those that need further data for resolution. These predicted tracks are compared with the next set of measurement data and the process continues. These tracks (including the predicted positions of the true target and false targets) may also be used by the sensor resource manager 106 to point the radar sensor to the most likely target positions and to choose the waveform that will most likely produce target detections and best resolve current angle ambiguities.

This way, radar or sensor resources to resolve angle ambiguities are substantially reduced and target tracking process is improved.

Figure 2:
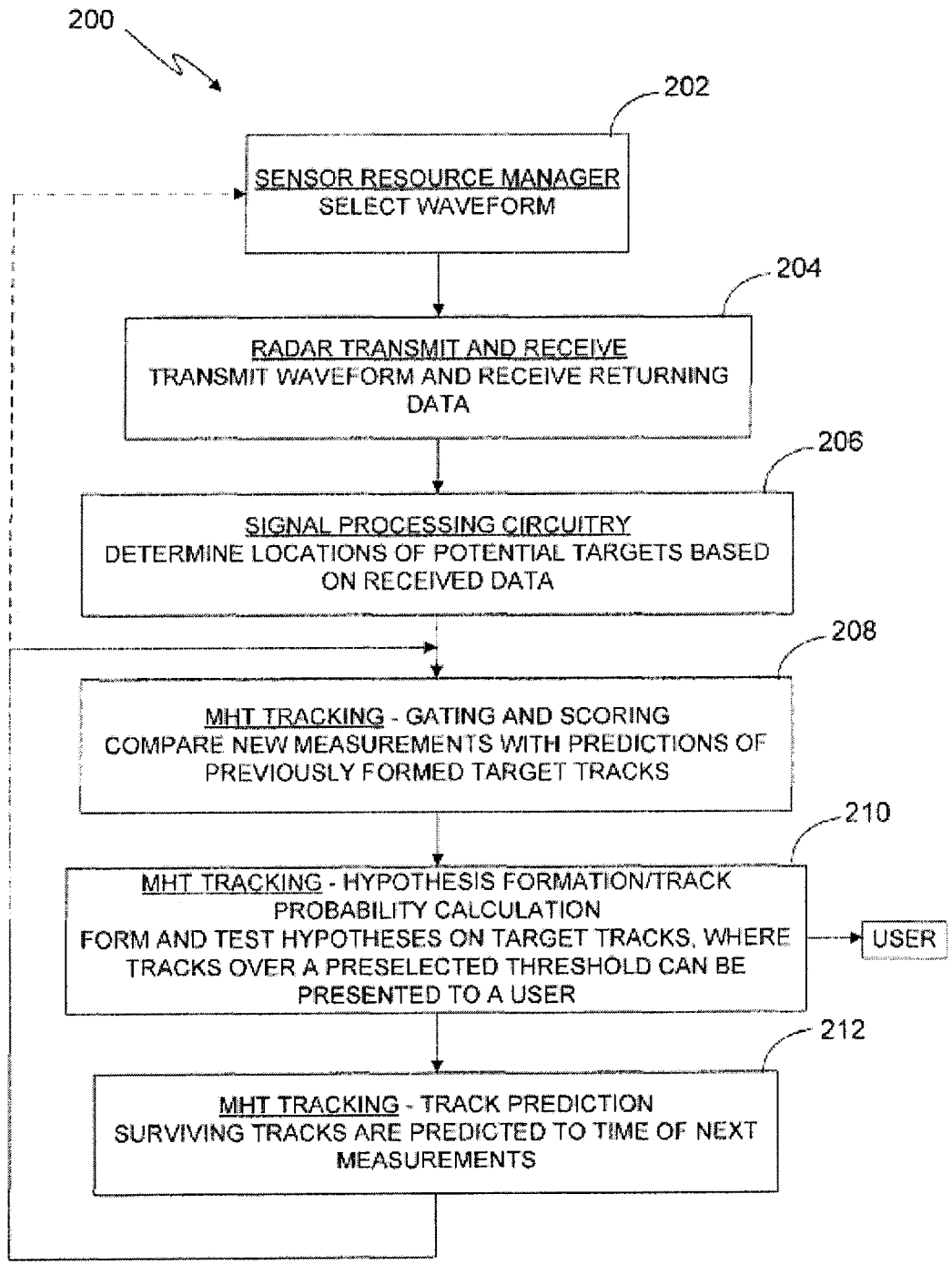
FIG. 2 is an exemplary process flow diagram for prediction radar tracks using multiple hypothesis tracking, according to some embodiments of the disclosed invention.

FIG. 2 is an exemplary process flow diagram for predicting radar tracks using multiple hypothesis tracking, according to some embodiments of the disclosed invention. Process 200 can be used in conjunction with the radar system of FIG. 1. The process selects (202) a waveform at a sensor resource manager. The process then transmits (204) the selected waveform and receives returning data using radar transmit and receive circuitry. This returned data includes information from both true targets as well as extraneous objects such as clutter (e.g., false targets). For example, there may be four angles in the return data for potentially each ambiguous range and more for each ambiguous Doppler, only one of which is a true angle of the target. These detections are formed for each target detection, at a given range and a given Doppler for all four angles.

The process then determines (206) the locations of potential targets based on the received data using signal processing circuitry. The process then compares (208) the new location measurements at the next dwell with predictions of previously formed target tracks using gating and scoring functions associated with MHT tracking circuitry. The detections of the previous dwell are gated with the predicted tracks from the previous dwell. For example, the process of the disclosed invention compares the predicted position of existing tracks with the position of the measurements and if they gate, the process applies the scoring function to the new branch tracks. If a target is detected, the correct unfolded detection will always be available.

The process then forms and tests (210) hypotheses on target tracks using hypothesis formation and track probability calculations associated with the MHT tracking circuitry. In forming and testing the hypotheses, all tracks that were initiated or updated by measurements that are in the same ambiguity set can be defined to be incompatible. Thereafter, hypotheses can be formed by collecting compatible tracks into hypotheses and computing the probabilities of those hypotheses. The score is just the log likelihood score which is a function of normalized gating distance (kinematic consistency). This score is summed for each hypothesis and a likelihood is formed. This likelihood is summed over all hypotheses and is used as a normalization factor to calculate the probability for each hypothesis and also the probability of each track.

Track probabilities are then computed from the hypothesis probabilities, as described below. Tracks, the probabilities of which, fall below a deletion threshold can be deleted, and subject to further tests that are required to maintain computational feasibility, the remaining tracks are propagated to the next dwell. Since incompatible tracks cannot be contained in the same hypothesis, the members of ambiguity sets are competing for probability. As the dwells are repeated over time, eventually at most one member of an ambiguity set will be contained in any track that is continued over time. Once the range, Doppler and angle ambiguities are resolved and a track passes all confirmation thresholds, the track can be presented to the user. A typical confirmation score threshold is set to require three or four detections on the target in order to confirm and display a target track to the end user. The score of a track is representative how well detections match up with the predicted track states. The confirmation threshold can be adjusted depending on a variety of factors including the environment's target density, sensor's false alarm rate, and end user's requirement for time to display a target track.

The process then predicts (212) the surviving tracks after pruning to the time of the next measurement dwell using a track prediction function provided by the MHT tracking circuitry. This generally includes both tracks that are resolved and those that need further data for resolution. The predicted tracks can then be compared (208) with the next set of measurement data and the process continues. These predicted tracks may also be used by the sensor resource manager 106 (provided there are no updated tracks in the incompatible track set) to point the sensor to the most likely target positions and to choose the waveform (202) that will most likely produce target detections and best resolve current ambiguities. If tracks are updated in the incompatible track set then the best updated track will be used as input to the sensor resource manager, in bock 202. The AAS sets provide describe how the ambiguous angles relate to the ambiguous unfolded range and Doppler measurements. For each ambiguous angle an unfolded range and Doppler measurement are used to form a new observation. For example, if there are 4 ambiguous angles, 2 unfolded ranges and 2 unfolded Doppler ambiguities, 16 new measurements need to be formed.

After processing all the ambiguous angle detections in a dwell, tracks are scored and the best hypothesis of tracks is determined. Tracks at the correct ambiguity will have the highest scores. Since tracks sharing detections from the same AAS cannot be in the same hypothesis, an ambiguous angle detection corresponds to at most one target. After hypothesis formation, the best hypothesis tracks are presented or transmitted to a user or systems/devices to perform target detection, target tracking, navigation (including autonomous vehicles and platforms). Then track prediction propagates all tracks to the next dwell time and the process continues.

For example, for a given target, assume that four angles a1, b1, c1 and d1 are returned by the first dwell (at time T1) at a first range R1 and a first Doppler DP1 of the target. There would be 4 measurements formed in AAS1: (1) a1, R1, DP1; (2) b1, R1, DP1; (3) c1, R1, DP1; and (4) d1, R1, DP1. Only one of these angles is the true angle and the other three angles are false angles. These angles are stored in an ambiguous angle set 1 (AAS1). In the next dwell at time T1, four other angles are returned for a new range and Doppler R2 and DP2, where R2 is at the next dwell at a later time than R1. The process compensates for the change of range, Doppler and angle using gating and scoring functions associated with MHT tracking circuitry.

Whenever the radar dwell contains the target and the target is detected, the true angle is present. However, depending on the radar dwell pointing location relative to the target, the incorrect ambiguous angles may change (beyond reasonable expectations of a real target). Careful selection of the radar dwell pointing location in the sensor manager 106 can ensure that the ambiguous angle returns will change. Over time, because the true angle of the target is present whenever the target is detected, the track at the true angle of the target will have the greatest number of detections and detections that fall closest in line to the track predictions. This will be reflected in the score of the track at the true angle of the target. By requiring a track to have a score higher than all other tracks in the AAS by a threshold before it can be confirmed to the end user, it is ensured that confirmed tracks to the end user are at the correct angle. Track scores are dependent on a variety of tracking system parameters, but analysis shows that setting a score threshold that is similar to the score increase that a track receives for gating with a detection that is within 2-sigma of the track prediction is sufficient.

The example above has been limited to one range and Doppler ambiguity for simplicity reasons. In some embodiments, if there are multiple ambiguous range and Doppler detections, then multiple detections will be formed from each ambiguity, for example, as described above, if there are four ambiguous angles and four ambiguous ranges and Dopplers, then 64 detections are formed.

This way, angle ambiguities are resolved over time as dwells generating ambiguous angle detections revisit the scan region. In the MHT, tracks are initiated at same range and Doppler, grouped into an ambiguous angle set (AAS) and updated using all unfolded possibilities. For example, if there are 4 angles ambiguities, 4 unfolded ranges and 4 unfolded Dopplers, the new observations are 64 (4*4*4=64). If the Range and Doppler ambiguities are reduced to 2 then the number of unfolded observations becomes 4*2*2 or 16 new observations.

Although, blocks 208 to 212 illustrate one implementation of MHT, other suitable MHT processes can be used as well. For example, another suitable MHT process is described in U.S. Pat. No. 5,414,643, the entire content of which is hereby incorporated by reference. Another suitable MHT process is described in an article entitled, "Multiple Hypothesis Tracking For Multiple Target Tracking", by Samuel Blackman, published January 2004 in IEEE A&E Systems Magazine, Vol. 19, No. 1, the entire content of which is hereby incorporated by reference.

In some embodiments, process 200 can perform the sequence of actions in a different order. In some embodiments, the process can skip one or more of the sub-processes. In some embodiments, one or more of the actions are performed simultaneously. In some embodiments, additional actions can be performed to further improve the process.

Figure 3:
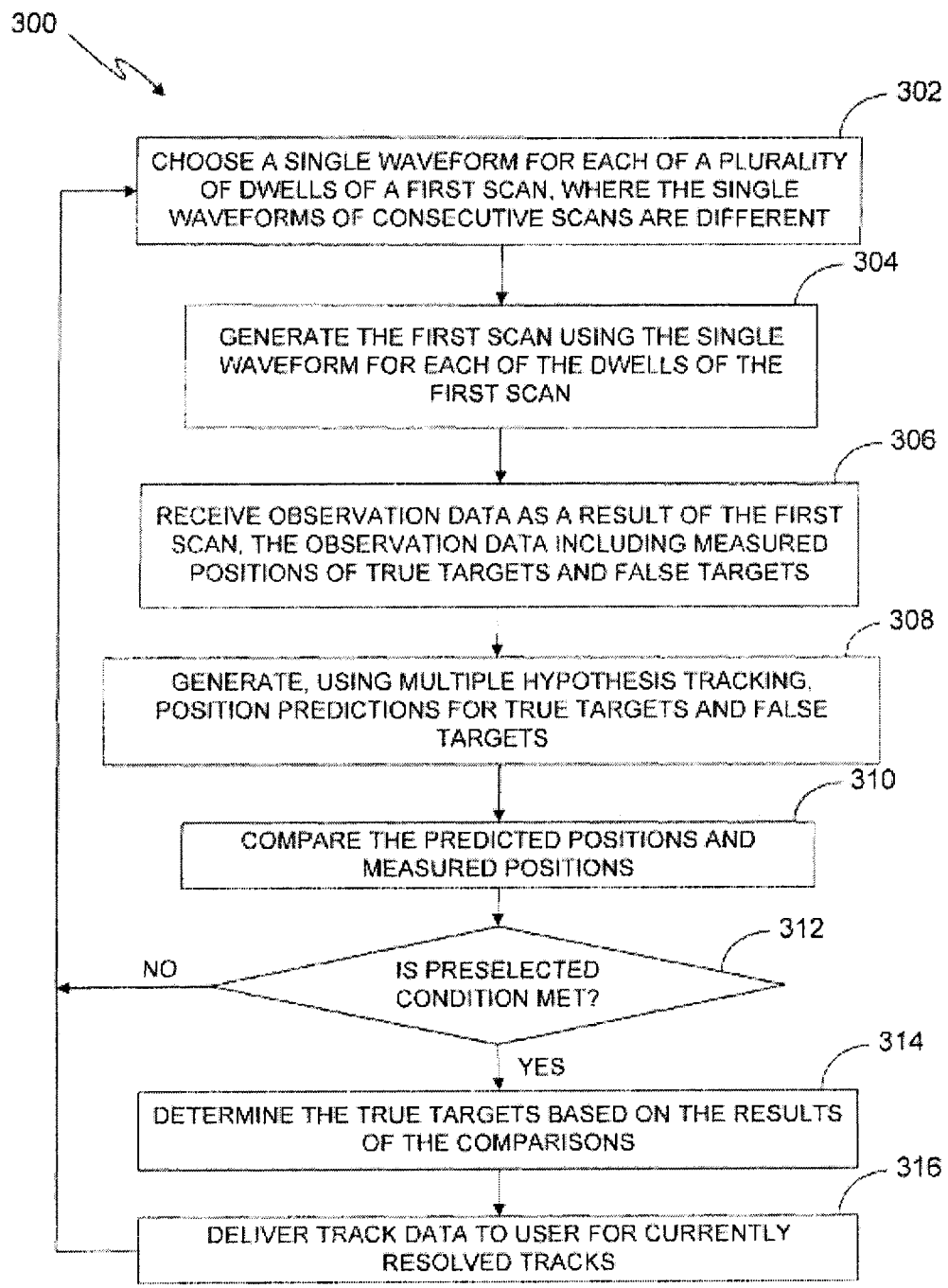
FIG. 3 is an exemplary process flow diagram for resolving radar angle ambiguities using multiple hypothesis tracking, according to some embodiments of the disclosed invention.

FIG. 3 is an exemplary process flow diagram for resolving radar angle ambiguities using multiple hypothesis tracking, according to some embodiments of the disclosed invention. As illustrated, process 300 can be used in conjunction with the radar system of FIG. 1. The process first chooses (302) a single waveform for each of a plurality of dwells of a first scan, where the single waveforms of consecutive scans are different. The same waveform is used for all dwells on a given scan but the waveforms are changed from scan-to-scan, typically using a predetermined schedule. In some embodiments, the process uses a set of preselected waveforms and then cycles through the set of preselected waveforms in a calculated manner. The process then generates (304) the first scan using the single waveform for each of the dwells of the first scan. The process then receives (306) observation data as a result of the first scan, the observation data including measured angles and positions of true targets and false targets.

The process generates (308), using multiple hypothesis tracking, angles and position predictions for true targets and false targets. The process then compares (310) the predicted positions and measured positions. The process then determines (312) whether a preselected process condition is met. In some embodiments, the preselected process condition tests whether the predicted position is within a preselected distance of the measured position. If so, the process then determines (314) the true targets based on the results of the comparisons. If the preselected process condition is not met, the process returns to choosing (302) a single waveform for each of a plurality of dwells of a scan. After the process determines the true targets based on the results of the comparisons (e.g., through target resolution), the process delivers (316) the target data to a user for currently resolved tracks and then returns to block 302 to choose a preselected waveform again. In some embodiments, the process skips block 316 and returns to block 302 after block 314.

In some embodiments, the process may perform the sequence of actions in a different order. In some embodiments, the process may skip one or more of the actions. In some embodiments, one or more of the actions are performed simultaneously. In some embodiments, additional actions can be performed.

Figure 4:
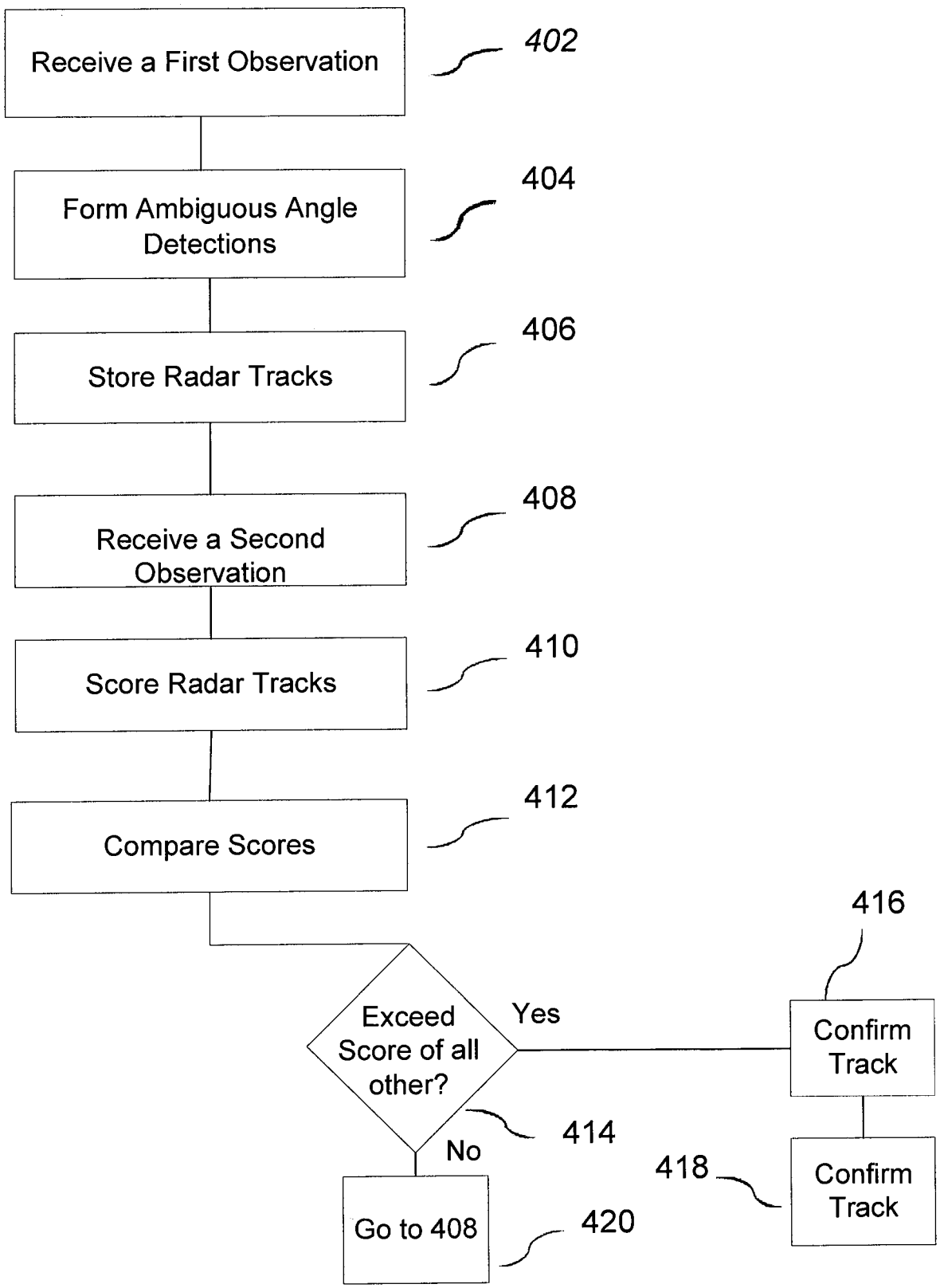
FIG. 4 is an exemplary process flow diagram for resolving angle ambiguities, according to some embodiments of the disclosed invention.

FIG. 4 is an exemplary process flow diagram for resolving radar angle ambiguities using multiple hypothesis tracking, according to some embodiments of the disclosed invention. Once return signals of a first scan are received for example by a radar system, a first observation data including true targets and false targets (with angle ambiguity) are generated and received (for instance by the receiver 110 in FIG. 1), in block 402. In block 404, a processor, such as the signal processor 104 of FIG. 1 then forms ambiguous angle detection sets using unfolding data from the first radar scan, for example, by grouping angle ambiguous detections into an incompatible set and initializes radar tracks at each of the ambiguous angle detections. The processor then store the radar tracks for the first observation in a computer memory, in block 406.

In block 408, a second observation data is also received (by the receiver 110) as a result of a second radar scan for the same given radar range and Doppler. The second observation data also includes second measured angles of the true target and false angle ambiguities. In some embodiments, position predictions for the true target and the false angle ambiguities are generated, using multiple hypothesis tracking, to form a plurality of radar tracks for the first and second observation data. Each of the plurality of radar tracks results from angle ambiguities.

The first and second observation data are group into separate incompatible observation sets, where the radar tracks that are initiated or updated with detections from the same incompatible observation set are defined to be incompatible with each other. For example, given an observation (detection) that has 4 ambiguities in angle (A1, A2, A3, A4), 4 tracks at each of the four ambiguities are initialized. The detections A1, A2, A3 and A4 are also placed (e.g., stored in a memory) into an incompatible set. The tracks initialized at A1, A2, A3, and A4 are also placed into an ambiguous angle set. At a later time, another detection is made on the target again with ambiguous angles A1', A2', A3' and A4' (second observation in block 404). Assuming A1 is the correct range, A1 will always be available in both detections, but A2, A3, A4 may not (if the target changes position relative to the dwell that observes the target).

After processing all of the ambiguous angle detections in a dwell, the tracks are scored in block 410 (for example, by the MHT tracking circuitry 102 in FIG. 1) to determine a best hypothesis of tracks, wherein a hypothesis for the MHT is formed by collecting compatible tracks into the hypothesis and computing probabilities of the hypothesis by using the score of each radar track in said hypothesis. In some embodiments, goodness of fit between the measurements and the track predictions is used to score the branch tracks that are formed by updating a prior track with a new measurement. In some embodiments, the process of the disclose invention uses kinematic information (velocity and maybe acceleration) to move the track to a new time epoch, i.e., new dwell. Goodness of fit can be defined by a track score that measures the kinematic consistency of the observations in a track with previously defined models for target dynamics and measurement quality.

The scores of all the radar tracks originating from the first observation data are compared to determine whether one of the scores of the radar tracks exceeds the scores of all other radar tracks originating from the same first observation data by a predetermined range, in block 412. For example, if false ambiguous returns A2, A3, and A4 are consistently received, the track initialized at the correct ambiguity A1, will have nearly identical scores as the tracks initialized at the incorrect ambiguities A2, A3, and A4. The reason is that all angle ambiguities produce tracks that have similar kinematic motion. Therefore, since over time, the incorrect angle ambiguity may not always be present but the correct angle ambiguity will always be present (i.e., on a future dwell), A1', A2', A5' and A6' may be obtained on a first dwell and A1', A3', A4' obtained on another dwell. As a result, the track at the correct ambiguity will always be tied for the most number of detections which translates to the track being tied for the highest score.

When a score of a particular radar tracks exceeds the scores of all the other radar tracks originating from the same first observation data by a predetermined confirmation threshold (block 414), the particular radar track is confirmed as corresponding to the true target, in block 416. In block 418, the confirmed radar track is then transmitted to external devices for further data processing, for example, for target detection, target tracking, and navigation including autonomous vehicles and platforms.

When there is not any radar track whose score exceeds the scores of all the other radar tracks originating from the same first observation data by the predetermined range, blocks 404 to 416 are repeated until the score of one radar track exceeds the scores of all the other radar tracks originating from the same first observation data by the predetermined confirmation threshold, or until a predetermined number of iterations is reached, as shown in block 420.

The track at the correct angle ambiguity will be a clear candidate if for each of the incorrect angle ambiguities, there existed a dwell that detected the target but did not produce a detection at that incorrect angle ambiguity. Comparing the scores of all of the tracks in the ambiguous angle set determines when a clear winner candidate has emerged and the track are confirmed (satisfy a confirmation criteria, e.g., a confirmation probability threshold) and output to a user or another system for further processing according to a specific application.

If there is no clear candidate winner, the track won't be confirmed yet. In this case where a clear winner has not emerged in the ambiguous angle set, the process flow awaits a future detection on the target before confirming a track to the user. If a track is output to the user in the case where a clear winner has not emerged, there is a good chance that the track at the incorrect angle ambiguity will be output to the user (i.e., ~50% error probability if there are 2 tracks in AAS with similar scores, ~66% error probability if there are 3 tracks, and ~75% error probability if there are 4 track, etc.). The fact that ambiguous detections at A1, A2, A3, and A4 were placed into an incompatible set means that only one of the tracks using one of the ambiguity can be confirmed, and since the process waits for a clear When a track in the AAS emerges as a winner, the winning track in the AAS is confirmed and output to the user or another system for further processing according to a specific application. This way, the use of the AAS and waiting for a clear winner in the AAS before confirming a track confidently confirms tracks at the correct angle ambiguity.

Figure 5:
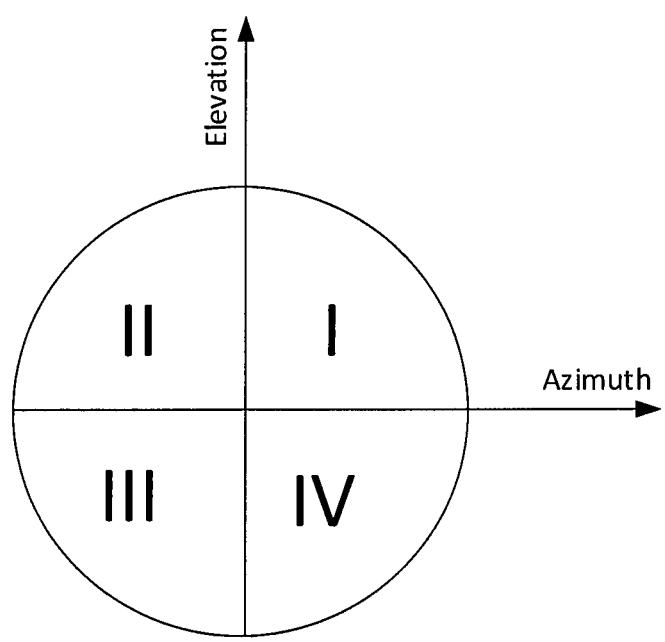
FIG. 5 is an exemplary diagram illustrating a quadrant using 4 adjacent antenna elements in 4 ambiguous angle detections which are input to the multiple hypothesis tracking, according to some embodiments of the disclosed invention.

The reason that the correct ambiguous angle is always present, but the other incorrect ambiguous angles may change is described in detail below with respect to FIG. 5, when angle ambiguity is due to the use of spoiled beams. In some embodiments, the disclosed invention defines a quadrant using 4 adjacent antenna elements as an interferometer resulting in 4 ambiguous angle detections which are input to the MHT. For simplicity reasons, let's assume the following is a model of the beam. If the target lies within the beam (depicted circle), a target detection is made. If the target lies in quadrant I, the incorrect ambiguous detections will be in quadrant II (relative to true target detection, ambiguity has similar elevation, lower azimuth), in quadrant III (relative to true target detection, ambiguity has lower elevation, lower azimuth), and in quadrant IV (relative to true target detection, ambiguity has lower elevation, similar azimuth). If the target lies in quadrant II, the incorrect ambiguous detections will be in quadrant I (relative to true target detection, ambiguity has similar elevation, higher azimuth), quadrant III (relative to true target detection, ambiguity has lower elevation, similar azimuth) and quadrant IV (relative to true target detection, ambiguity has lower elevation, higher azimuth), and so on.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method, executed by a radar system including one or more processors, a transmitter and a receiver, for resolving radar angle ambiguity using multiple hypothesis tracking (MHT), the method comprising:
   a) transmitting a radio frequency signal by the transmitter of the radar system in a first radar scan for a given radar range and Doppler;
   b) receiving first observation data by the receiver of the radar system as a result of the first radar scan for the given radar range and Doppler, the first observation data comprising first measured angles of a true target and false angle ambiguities;
   c) forming ambiguous angle detections using unfolding data from the first radar scan and initializing radar tracks at each of the ambiguous angle detections, by the one or more processors;
   d) storing all radar tracks formed from the ambiguous angle detections into an ambiguous angle set in a memory, wherein the ambiguous angle set is a subset of incompatible angles containing detections at the given ambiguous range and Doppler but at different ambiguous angles;
   e) receiving a next observation data by the receiver of the radar system as a result of a next radar scan for the same given radar range and Doppler, the next observation data comprising measured angles of the true target and the false angle ambiguities;
   f) scoring the radar tracks to determine a best hypothesis of tracks, wherein a hypothesis for the MHT is formed by collecting compatible tracks that are in a given ambiguity set containing radar detections at the given ambiguous range and Doppler but different ambiguous angles into the hypothesis and computing probabilities of the hypothesis by using the score of each radar track in said hypothesis;
   g) comparing the scores of all the radar tracks originating from the first observation data to determine whether one of the scores of the radar tracks exceeds the scores of all other radar tracks originating from the first observation data by a predetermined range;
   h) when a score of a particular radar track exceeds the scores of all the other radar tracks originating from the first observation data by a predetermined confirmation threshold, confirming the particular radar track as corresponding to the true target;
   i) transmitting the confirmed radar track for further data processing to detect the true target; and
   j) when there is not any radar track whose score exceeds the scores of all the other radar tracks originating from the first observation data by the predetermined range, repeating steps c to i until the score of one radar track exceeds the scores of all the other radar tracks originating from the first observation data by the predetermined confirmation threshold, or until a predetermined number of iterations is reached.

2. The method of claim 1, wherein the predetermined confirmation threshold is set to require three or four detections on the target.

3. The method of claim 1, wherein the predetermined confirmation threshold is adjusted depending on one or more of an environment's target density, sensor's false alarm rate, and user requirement.

4. The method of claim 1, wherein the further data processing comprises data processing for one or more of radar applications, self-driving car applications, and navigation applications.

5. The method of claim 1, further comprising storing detections at the ambiguous range and Doppler but different ambiguous angles in an incompatible observation set.

6. The method of claim 1, further comprising transmitting a plurality of different pulse repetition frequency rates (PRFs) for the first radar scan to improve angle ambiguity resolution.

7. The method of claim 1, further comprising performing gating to determine achievable observation-to-track association.

8. The method of claim 1, wherein the confirming the particular radar track is performed by an application of Sequential Probability Ratio Test (SPRT), wherein the predetermined confirmation threshold is selected to satisfy a system defined false track acceptance requirement.

9. The method of claim 8, wherein the predetermined confirmation threshold is computed from an input rate of observations and a user specified false radar track confirmation rate.

10. The method of claim 1, further comprising computing predicted positions of the true target and false targets using the MHT.

11. The method of claim 10, wherein the predicted positions of the true target and false targets is used to point the radar to most likely target positions.

12. A radar system for resolving radar angle ambiguity using multiple hypothesis tracking (MHT) comprising:
    a transmitter for transmitting power selected waveforms for a plurality of radar scans;
    a receiver for receiving returning signals from true targets and extraneous returning signals from false targets; and
    one or more processors for:
      a) receiving first observation data as a result of a first radar scan for a given radar range and Doppler, the first observation data comprising first measured angles of a true target and false angle ambiguities;
      b) forming ambiguous angle detections using unfolding data from the first radar scan and initializing radar tracks at each of the ambiguous angle detections;
      c) storing all radar tracks formed from the ambiguous angle detections into an ambiguous angle set in a memory, wherein the ambiguous angle set is a subset of incompatible angles containing detections at a given ambiguous range and Doppler but at different ambiguous angles;
      d) receiving a next observation data as a result of a next radar scan for the given radar range and Doppler, the next observation data comprising measured angles of the true target and the false angle ambiguities;
      e) scoring the radar tracks to determine a best hypothesis of tracks, wherein a hypothesis for the MHT is formed by collecting compatible tracks that are in a given ambiguity set containing radar detections at the given ambiguous range and Doppler but different ambiguous angles into the hypothesis and computing probabilities of the hypothesis by using the score of each radar track in said hypothesis;
      f) comparing the scores of all the radar tracks originating from the first observation data to determine whether one of the scores of the radar tracks exceeds the scores of all other radar tracks originating from the first observation data by a predetermined range;

g) when a score of a particular radar track exceeds the scores of all the other radar tracks originating from the first observation data by a predetermined confirmation threshold, confirming the particular radar track as corresponding to the true target;

h) transmitting the confirmed radar track for further data processing to detect the true target; and i) when there is not any radar track whose score exceeds the scores of all the other radar tracks originating from the first observation data by the predetermined range, repeating steps b to i until the score of one radar track exceeds the scores of all the other radar tracks originating from the first observation data by the predetermined confirmation threshold, or until a predetermined number of iterations is reached.

13. The radar system of claim 12, wherein the predetermined confirmation threshold is set to require three or four detections on the target.

14. The radar system of claim 12, wherein the predetermined confirmation threshold is adjusted depending on one or more of an environment's target density, sensor's false alarm rate, and user requirement.

15. The radar system of claim 12, wherein the further data processing comprises data processing for one or more of radar applications, self-driving car applications, and navigation applications.

16. The radar system of claim 12, wherein the one or more processors store detections at the ambiguous range and Doppler but different ambiguous angles in an incompatible observation set.

17. The radar system of claim 12, wherein the transmitter transmits a plurality of different pulse repetition frequency rates (PRFs) for the first radar scan to improve angle ambiguity resolution.

18. The radar system of claim 12, wherein the one or more processors utilize gating to determine achievable observation-to-track association.

19. The radar system of claim 12, wherein the confirming the particular radar track is performed by an application of Sequential Probability Ratio Test (SPRT), wherein the predetermined confirmation threshold is selected to satisfy a system defined false track acceptance requirement.

20. The radar system of claim 12, wherein the one or more processor compute predict position of the true target and the false targets using the MHT, and wherein the predicted positions of the true target and false targets is used to point the radar to most likely target positions.

* * * * *